United States Patent
Kaminski et al.

(10) Patent No.: US 12,134,356 B2
(45) Date of Patent: Nov. 5, 2024

(54) VEHICLE CAMERA AND EVENT NOTIFICATION

(71) Applicant: Firstech, LLC, Kent, WA (US)

(72) Inventors: Jason Henry Kaminski, Renton, WA (US); Namwoo Kim, Bellevue, WA (US); Carmine Maraglio, Maple Valley, WA (US)

(73) Assignee: Firstech, LLC, Kent, WA (US)

(*) Notice: Subject to any disclaimer, the term of this patent is extended or adjusted under 35 U.S.C. 154(b) by 0 days.

(21) Appl. No.: 17/835,505

(22) Filed: Jun. 8, 2022

(65) Prior Publication Data
US 2022/0396208 A1    Dec. 15, 2022

Related U.S. Application Data

(60) Provisional application No. 63/208,978, filed on Jun. 10, 2021.

(51) Int. Cl.
| | |
|---|---|
| *B60R 11/04* | (2006.01) |
| *B60R 1/22* | (2022.01) |
| *B60R 1/29* | (2022.01) |
| *B60R 11/00* | (2006.01) |
| *G06V 20/40* | (2022.01) |
| *G06V 20/56* | (2022.01) |
| *H04L 12/40* | (2006.01) |
| *H04W 4/12* | (2009.01) |
| *H04W 4/40* | (2018.01) |

(52) U.S. Cl.
CPC ............ *B60R 11/04* (2013.01); *B60R 1/22* (2022.01); *B60R 1/29* (2022.01); *G06V 20/44* (2022.01); *G06V 20/56* (2022.01); *H04L 12/40117* (2013.01); *H04W 4/12* (2013.01); *H04W 4/40* (2018.02); *B60R 2011/0003* (2013.01); *B60R 2011/0005* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | |
|---|---|---|
| 2004/0257208 A1 | 12/2004 | Huang et al. |
| 2014/0002651 A1 | 1/2014 | Plante |
| 2015/0116491 A1* | 4/2015 | Cuddihy ............... H04N 7/185 348/148 |
| 2016/0050356 A1 | 2/2016 | Nalepka et al. |
| 2017/0129458 A1 | 5/2017 | Ge |
| 2017/0341611 A1 | 11/2017 | Baker et al. |
| 2018/0072270 A1 | 3/2018 | Renaud |
| 2018/0162322 A1 | 6/2018 | Boehm |
| 2018/0182185 A1 | 6/2018 | Tong et al. |

(Continued)

OTHER PUBLICATIONS

International Searching Authority, Patent Cooperation Treaty, International Application No. PCT/US2022/032915, Notification Date: Aug. 24, 2022, 2 pages.

(Continued)

*Primary Examiner* — Rebecca A Volentine
(74) *Attorney, Agent, or Firm* — Freestone Intellectual Property Law PLLC; Aaron J. Visbeek

(57) ABSTRACT

A camera for a vehicle includes an image sensor and processing logic. The image sensor captures event images based on one or more messages generated by the vehicle communication bus.

8 Claims, 7 Drawing Sheets

(56) References Cited

U.S. PATENT DOCUMENTS

| | | | |
|---|---|---|---|
| 2018/0227548 A1* | 8/2018 | Gusikhin | H04N 7/181 |
| 2020/0059626 A1 | 2/2020 | Champa | |
| 2020/0349345 A1* | 11/2020 | Hodge | G06Q 30/08 |
| 2021/0009145 A1 | 1/2021 | Zhang et al. | |
| 2021/0076009 A1 | 3/2021 | Choi | |
| 2021/0213901 A1 | 7/2021 | Yamamoto et al. | |
| 2022/0051029 A1 | 2/2022 | Cho et al. | |
| 2022/0250583 A1* | 8/2022 | Garg | B60R 25/102 |

OTHER PUBLICATIONS

International Searching Authority, Patent Cooperation Treaty, Written Opinion of the International Searching Authority, International Application No. PCT/US2022/032915, Notification Date: Aug. 24, 2022, 11 pages.

Co-pending U.S. Appl. No. 17/835,532 Jason Henry Kaminski et al., filed on Jun. 8, 2022.

Non-Final Office Action, U.S. Appl. No. 17/835,532, Notification Date: Jun. 1, 2023, 24 pages.

Co-pending U.S. Appl. No. 17/835,532 inventors Jason Henry Kaminski et al., filed on Jun. 8, 2022 p. 26.

Non-Final Office Action, U.S. Appl. No. 17/835,532 Notification Date: May 28, 2024, 18 pages.

Final Office Action, U.S. Appl. No. 17/835,532, Notification Date: Aug. 16, 2024, 18 pages.

\* cited by examiner

VEHICLE CAMERA AND EVENT NOTIFICATION

CROSS-REFERENCE TO RELATED APPLICATIONS

This application claims priority to U.S. provisional Application No. 63/208,978 filed Jun. 10, 2021, which is hereby incorporated by reference.

BACKGROUND INFORMATION

Dash cameras are a device that drivers place near the dash (or windshield) of a vehicle to record pictures or videos of the environment outside the vehicle. The dash cameras are placed inside the vehicle and oriented to record images through the windshield of the vehicle. Dash cameras may be fixed/mounted to the dash or windshield using adhesive and/or a suction cup. Dash cameras may be battery operated or be powered by a cigarette lighter or by receiving power from an on-board diagnostics (OBD) interface of a vehicle.

BRIEF SUMMARY OF THE INVENTION

Implementations of the disclosure include a vehicle comprising a factory vehicle computer, a Controller Area Network (CAN) bus, and a camera. The factory vehicle computer controls operation of the vehicle and controls access to the vehicle. The CAN bus is coupled to the factory vehicle computer and the CAN bus is configured to receive messages from the factory vehicle computer. The camera resides in a cabin of the vehicle. The camera is configured to receive the messages from the CAN bus and the camera is configured to capture event images in response to receiving a trigger message from the CAN bus.

In an implementation, the vehicle is further configured to wirelessly transmit event notification images in response to receiving the trigger message from the CAN bus and the event notification images are derived from the event images captured by the camera.

In an implementation, the vehicle is configured to transmit the event notification images over a cellular network.

In an implementation, the event notification images are of significantly reduced file size to the event images.

In an implementation, the trigger message includes at least one of (1) an unlock command indicating door locks of the vehicle are to be unlocked; (2) a lock command indicating door locks of the vehicle are to be locked; (3) a reverse message indicating the vehicle will traverse in reverse; (4) a fuel-level message indicating a level of fuel in the vehicle; (5) an odometer message indicating a mileage traveled by the vehicle; (6) a tire-pressure message indicating a pressure of one or more tires of the vehicle; (7) an ignition-start command; (8) a speed-of-the-vehicle message; (9) an acceleration-of-the-vehicle message; (10) an unauthorized-access message indicating the vehicle is being tampered with; (11) an accelerometer measurement indicating the vehicle has been impacted; (12) a child car-seat indicator; (13) a seat belt sensor state; (14) a gear selector position; (15) a lane assist and collision avoidance state; (16) rain sensor data; (17) temperature sensor data; (18) ignition status; (19) vehicle tilt sensor data; (20) Anti-lock Brake System (ABS) data; (21) traction control data; (22) vehicle speed sensor data; (23) battery voltage level; (24) Vehicle Identification Number (VIN); (25) odometer reading; (26) Diagnostic Trouble Code (DTC) status; (27) a low tire pressure message (e.g. Tire Pressure Monitoring System (TPMS)); (28) Original Equipment Manufacturer (OEM) alarm status (e.g. armed, disarmed, alarm triggered, etc.); (29) tachometer reading; (30) vehicle door, vehicle hood, vehicle frunk, and/or vehicle trunk status (e.g. open or closed); (31) brake status; (32) E-brake status; (33) OEM Radio Frequency Identification (RFID) entry sensor(s) status (e.g. is a key fob detected in proximity with the vehicle); (34) vehicle key position; (35) oil warning status; (36) glowplug status; (37) battery pack level; (38) electric range; (39) vehicle range; (40) charge remaining; (41) charging status; (42) charge door status; or (43) clear engine DTC.

Implementations of the disclosure include a dash-camera for a vehicle and the dash-camera includes an image sensor, a memory, and processing logic. The image sensor is for capturing event images in or around the vehicle. The memory is coupled to the image sensor and configured to store, at least temporarily, the event images captured by the image sensor. The processing logic is communicatively coupled to the image sensor. The processing logic is configured to initiate an image-capture by the image sensor to capture the event images in response to a trigger message on a vehicle communication bus of the vehicle.

In an implementation, the processing logic is further configured to wirelessly transmit event notification images in response to receiving the trigger message. The event notification images are the event images or derived from the event images.

In an implementation, the dash-camera also includes a vehicle communication bus interface configured to be connected to the vehicle communication bus of the vehicle. The processing logic is configured to receive the trigger message via the vehicle communication bus interface.

In an implementation, the processing logic is configured to receive a trigger command from a device coupled to receive the trigger message from the vehicle communication bus. The trigger command is generated in response to the device receiving the trigger message.

In an implementation, the vehicle communication bus is a Controller Area Network (CAN) bus.

In an implementation, the dash-camera also includes a second camera configured to capture second event images in response to the trigger message received from the vehicle communication bus.

In an implementation, the second camera is configured to image an interior of the cabin of the vehicle and the camera is configured to image an exterior of the vehicle through a window or windshield of the vehicle.

In an implementation, the dash-camera also includes a third camera configured to capture third event images in response to the trigger message received from the vehicle communication bus.

In an implementation, the dash-camera also includes an auxiliary camera interface configured to connect to an auxiliary camera for capturing auxiliary event images. The processing logic is also configured to send a capture-command to the auxiliary camera interface in response to the trigger message on the vehicle communication bus of the vehicle and receive auxiliary event images from the auxiliary camera via the auxiliary camera interface.

In an implementation, the trigger message includes at least one of (1) an unlock command indicating door locks of the vehicle are to be unlocked; (2) a lock command indicating door locks of the vehicle are to be locked; (3) a reverse message indicating the vehicle will traverse in reverse; (4) a fuel-level message indicating a level of fuel in the vehicle; (5) an odometer message indicating a mileage traveled by the vehicle; (6) a tire-pressure message indicating a pressure of one or more tires of the vehicle; (7) an ignition-start command; (8) a speed-of-the-vehicle message; (9) an acceleration-of-the-vehicle message; (10) an unauthorized-access message indicating the vehicle is being tampered with; (11) an accelerometer measurement indicating the vehicle has been impacted; (12) a child car-seat indicator; (13) a seat belt sensor state; (14) a gear selector position; (15) a lane assist and collision avoidance state; (16) rain sensor data; (17) temperature sensor data; (18) ignition status; (19) vehicle tilt sensor data; (20) Anti-lock Brake System (ABS) data; (21) traction control data; (22) vehicle speed sensor data; (23) battery voltage level; (24) Vehicle Identification Number (VIN); (25) odometer reading; (26) Diagnostic Trouble Code (DTC) status; (27) a low tire pressure message (e.g. Tire Pressure Monitoring System (TPMS)); (28) Original Equipment Manufacturer (OEM) alarm status (e.g. armed, disarmed, alarm triggered, etc.); (29) tachometer reading; (30) vehicle door, vehicle hood, vehicle frunk, and/or vehicle trunk status (e.g. open or closed); (31) brake status; (32) E-brake status; (33) OEM Radio Frequency Identification (RFID) entry sensor(s) status (e.g. is a key fob detected in proximity with the vehicle); (34) vehicle key position; (35) oil warning status; (36) glowplug status; (37) battery pack level; (38) electric range; (39) vehicle range; (40) charge remaining; (41) charging status; (42) charge door status; or (43) clear engine DTC.

Implementations of the disclosure include a camera for a vehicle that includes an image sensor, a CAN bus interface, and processing logic. The image sensor is for capturing event images in or around the vehicle. The processing logic is communicatively coupled to the image sensor and communicatively coupled to the CAN bus interface. The CAN bus interface is configured to receive one or more CAN messages generated by a CAN bus of the vehicle.

In an implementation, the processing logic is configured to drive the image sensor to capture the event images based on the one or more CAN messages received from the CAN bus of the vehicle.

In an implementation, the processing logic is configured to drive the image sensor to capture the event images based on receiving a first CAN message and a second CAN message within a first time period.

In an implementation, the camera includes a wireless radio and the processing logic is also configured to transmit, at least portions of the event images to a remote device using the wireless radio based on the one or more CAN messages received from the CAN bus of the vehicle.

In an implementation, the wireless radio includes a cellular interface and transmitting the at least portions of the event images includes transmitting the at least portions of the event images over a cellular network.

Implementations of the disclosure include a method including receiving, with a dash-camera, one or more Controller Area Network (CAN) messages generated by a CAN bus of a vehicle; capturing one or more event images with the dash-camera based on receiving the one or more CAN messages; and wirelessly transmitting at least one event notification image to a user device. The at least one event notification image is derived from the one or more event images captured by the dash-camera in response to the receiving the one or more CAN messages generated by the CAN bus of the vehicle.

In an implementation, the method further includes receiving a response request from the user device and wirelessly transmitting additional event notification images to the user device in response to receiving the response request from the user device.

In an implementation, the additional event notification images include a video of the event images and the event notification images includes still images of the event images.

In an implementation, the event notification images are all of the event images.

In an implementation, the event notification images are a subset of the event images.

In an implementation, the event notification images include reduced resolution images of the event images.

In an implementation, the event images are in a video format and the event notification images include still images of the video format.

In an implementation, the event images are in a video format and the event notification images are a truncated portion of the event images.

In an implementation, wirelessly transmitting the event notifications images includes transmitting the event notifications images over a cellular network.

In an implementation, wirelessly transmitting the event notification images includes transmitting the event notifications images over a wireless local area network.

In an implementation, event images are in a video format.

Implementations of the disclosure include a method including receiving with a camera, one or more vehicle communication bus messages generated by a vehicle communication bus of a vehicle; capturing one or more event images with the camera based on receiving the one or more vehicle communication bus messages; and wirelessly transmitting at least one event notification based on receiving the one or more vehicle communication bus messages generated by the vehicle communication bus of the vehicle.

In an implementation, wirelessly transmitting the event notification includes transmitting the event notification over a cellular network.

In an implementation, wirelessly transmitting the event notification includes transmitting the event notification to a user device.

In an implementation, the event notification includes at least a portion of the event images captured by the camera based on receiving the one or more vehicle communication bus messages.

Implementations of the disclosure include a method including receiving with a dash-camera, a trigger signal; capturing event images with the dash-camera in response to receiving the trigger signal; and selectively wirelessly transmitting event notification images to a user device based on receiving the trigger signal.

In an implementation, the trigger signal is a Controller Area Network (CAN) message from a CAN bus of a vehicle.

In an implementation, the method further includes selecting, prior to wirelessly transmitting the event notification images to the user device, a quality of the event notification images based on a category of the CAN message In an implementation, the method further includes determining, prior to wirelessly transmitting the event notification images to the user device, a category of the CAN message. Wirelessly transmitting the event notification images to the user device is performed when the CAN message is in a user-selected category and wirelessly transmitting the event notification images is omitted when the CAN message is outside a user-selected category In an implementation, the method further includes detecting a vehicle fob that is learned to a vehicle; and selectively omitting the wireless transmitting of the event notification images when the vehicle fob is detected within a given time period of receiving the trigger signal.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method for a vehicle camera are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," "one implementation," "an implementation" or "an embodiment" means that a particular feature, structure, or characteristic described in connection with the embodiment or implementation is included in at least one embodiment or implementation of the present invention. Thus, the appearances of the phrases "one embodiment," "one implementation," "an implementation" or "an embodiment" in various places throughout this specification are not necessarily all referring to the same embodiment or implementation. Furthermore, the particular features, structures, or characteristics may be combined in any suitable manner in one or more embodiments or implementations.

Throughout this specification, several terms of art are used. These terms are to take on their ordinary meaning in the art from which they come, unless specifically defined herein or the context of their use would clearly suggest otherwise.

Implementations of the disclosure include a camera for a vehicle. The camera may be a dash camera that may be referred to as a "dash-cam". The camera may be configured to capture event images in or around a vehicle based on messages on a vehicle communication bus such as a Control Area Network (CAN) bus. The camera may also wirelessly transmit at least a portion of the event images to a user device. The camera may wirelessly transmit event images (stills and/or video) via a cellular network or a wireless local area network (WLAN) to a user device (e.g. a smartphone). In some implementations, the user receives an event notification on a user interface of the user device and sends a response request back to the camera. When the camera receives the response request from the user device, the camera may send additional event images or higher quality event images to the user device. These and other implementations are described in detail below with respect to FIGS. 1-7.

Figure 1:
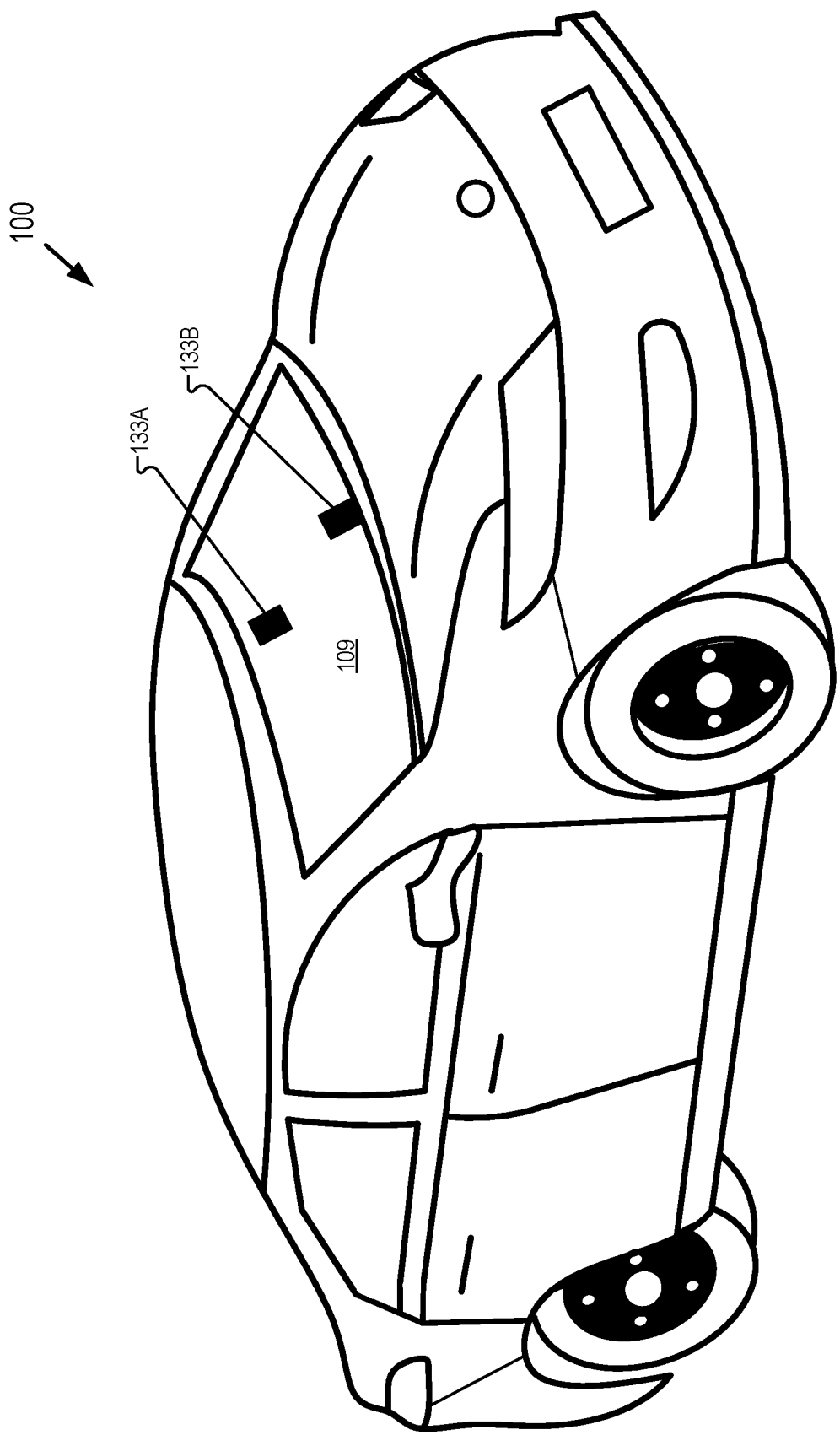
FIG. 1 illustrates a vehicle including one or more dash-cams coupled with a windshield of the vehicle, in accordance with an embodiment of the disclosure.

FIG. 1 illustrates a vehicle 100 including one or more dash-cams 133 coupled with a windshield 109 of the vehicle 100, in accordance with aspects of the disclosure. Vehicle 100 may be any vehicle such as a car, truck, or sport utility vehicle (SUV). Vehicle 100 may include a petrol powerplant or an electric motor for propulsion. Dash cam 133A illustrates that a dash cam may be mounted to the windshield in proximity to a rear-view mirror, in some implementations. Dash-cam 133B illustrates that a dash cam may be mounted to the windshield closer to (or even resting on) a dash of the vehicle, in some implementations. Dash-cams may also be referred to as a "dash camera" in this disclosure. The cameras described in the disclosure may not necessarily be dash-cams and may not necessarily be configured to be mounted on a windshield or dash of a vehicle 100. While not particularly illustrated in FIG. 1, additional cameras may be mounted to image inside or outside the vehicle 100. For example, an additional camera may be mounted as a rear-view or backup camera, in accordance with some implementations of the disclosure.

Figure 2:
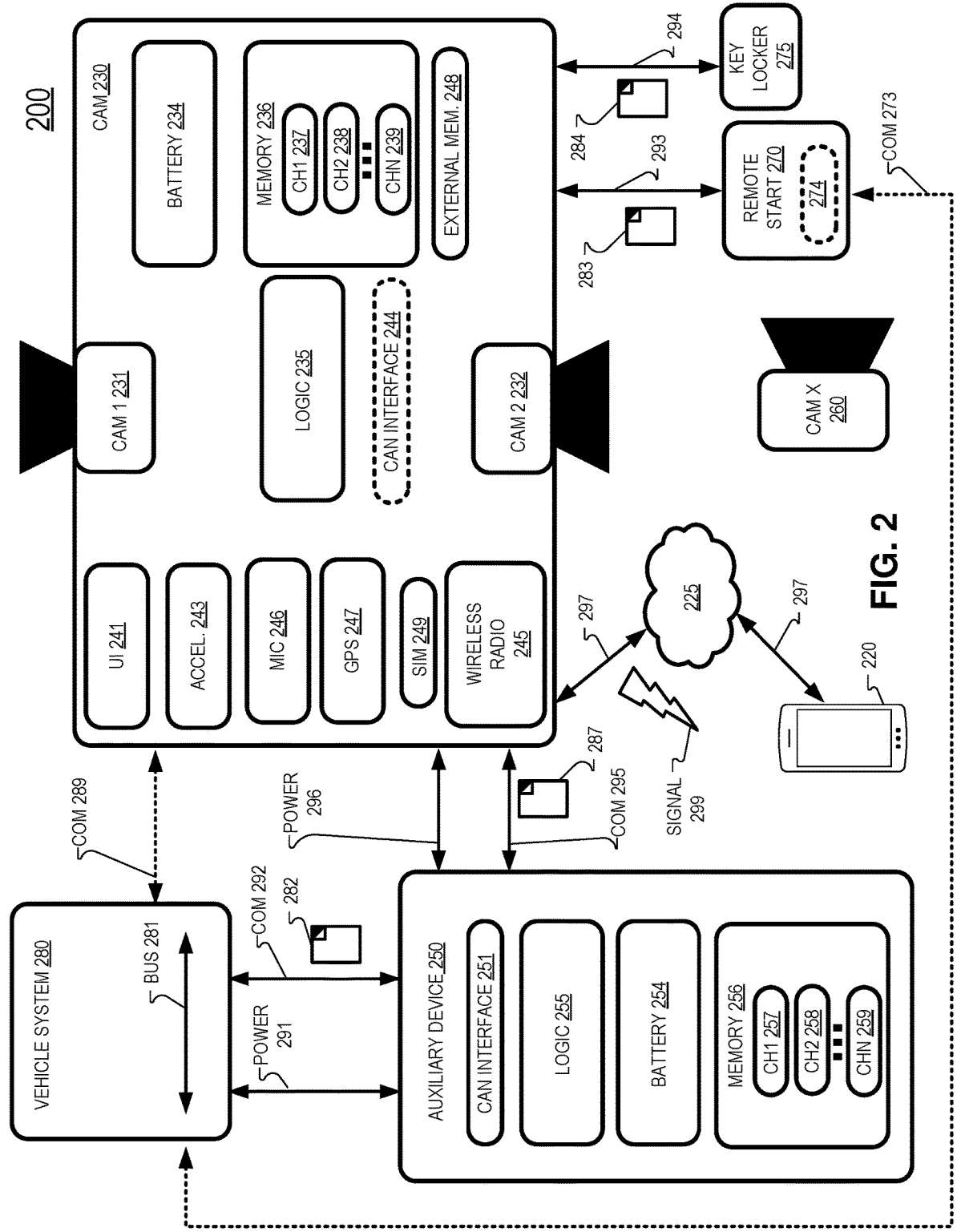
FIG. 2 illustrates a system for a vehicle, in accordance with an embodiment of the disclosure.

FIG. 2 illustrates a system 200 for a vehicle, in accordance with implementations of the disclosure. Example system 200 includes a vehicle system 280, an auxiliary device 250, and a camera 230. Camera 230 may be configured as a dash-cam (aka "dash camera"). Camera 230 includes a first camera 231 and a second camera 232. First camera 231 and second camera 232 may include CMOS image sensors, for example. Camera 231 may be oriented to capture images out of a windshield (the front of vehicle 100) and camera 232 may be oriented to capture images of the cabin (interior) of the vehicle 100. Camera 232 may be oriented to capture images of the exterior of the vehicle, in some implementations. For the purposes of this disclosure, the term "image" or "images" includes still images and/or video images.

Camera 230 including processing logic 235 and memory 236. Processing logic 235 may also include its own memory. Processing logic 235 may be configured to read/write memory 236. Memory 236 may include volatile and/or non-volatile to store instructions to execute operations and/or store data. Memory 236 may be provisioned or partitioned into memory segments dedicated to particular cameras. For example, camera 231 may store images from camera 231 to memory space 237 and store images captured by camera 232 to memory space 238. Memory 236 may include memory space for integer n number of cameras where memory space 239 represents the memory space for the nth camera in the array of n cameras. Memory 236 may include gigabytes or terabytes of storage, for example. Camera 230 may include an external memory slot 248 to receive an external memory card (e.g. 128 GB or 500 GB card).

Processing logic 235 may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic 235 to store instructions to execute operations and/or store data. Processing logic 235 may include communication interfaces to facilitate wired communication over various wired communication protocols (e.g. ethernet, USB, UART, etc.)

Camera 230 includes an optional battery 234. Optional battery 234 may be considered a backup power source to allow the camera 230 to capture images for many days even if the vehicle is not turned on by a user.

Camera 230 may include a user interface (UI) 241 to allow a user to operate the camera. For example, UI 241 may include buttons, dials, touchscreens, displays, or any other suitable user interface to allow the user to operate and interact with camera 230. Camera 230 may include an accelerometer 243, a microphone 246, a speaker (not specifically illustrated), and a GPS sensor 247. Processing logic 235 may be communicatively coupled to accelerometer 243, microphone 246, and GPS sensor 247. In some implementations, one or more of cameras 231, 232, or 260 capture event images in response to signals provided from accelerometer 243, microphone 246, and/or GPS sensor 247 to processing logic 235. Based on the signals from accelerometer 243, microphone 246, and/or GPS sensor 247, processing logic 235 may drive cameras 231, 232, and/or 260 to capture event images.

Camera 230 includes a wireless radio 245. Wireless radio 245 may include antennas and corresponding circuitry to receive and/or transmit BlueTooth, cellular, IEEE 802.11x wireless communication signals and/or optical signals (e.g. infrared signals). Wireless radio 245 may therefore send/receive wireless signals to communicate with other components of systems 200 and/or a user device 220 via network 225. User device 220 may include a mobile device (e.g. smartphone or tablet), a computer, a radio-based remote control, or optical-based remote control. Wireless radio 245 may receive/transmit a wireless signal 299 from/to a cellular communications tower utilizing 2G/3G/4G/LTE/5G or other cellular data standard, in some implementations. In some implementations, a SIM card slot 249 is provided in camera 230 to insert a SIM card to facilitate cellular communications.

System 200 further includes vehicle system 280. Vehicle system 280 may have access to or include a vehicle computer that controls providing access to the vehicle and/or starting and stopping the vehicle. In one embodiment, vehicle system 280 includes a starting circuit that controls whether the vehicle can be started, by turning the keys in the ignition or by pushing a START/STOP button of the vehicle in combination with vehicle system 280 sensing a vehicle key. Vehicle system 280 may generally include electrical modules for operating a powerplant (electric, gasoline, diesel, fuel cell, hydrogen, etc.) of the vehicle, heating and cooling the vehicle, and providing vehicle information such as speed, position, and maintenance information to the user. Vehicle system 280 may include a plurality of electrical harnesses, electrical control modules, switches, and buttons. Vehicle system 280 includes a vehicle communication bus 281 to facilitate communication with/between the modules, electronics, and/or computers in vehicle system 280. Vehicle communication bus 281 may be implemented as a Controller Area Network (CAN) bus. Vehicle communication bus 281 is most often an original-equipment-manufacturer (OEM) installed bus. Vehicle system 280 may include a battery of the vehicle. The battery may be 12 VDC, 24 VDC, 48 VDC, or a larger voltage, for example.

Auxiliary device 250 is configured to receive electrical power 291 from vehicle system 280. Auxiliary device 250 is configured to communicate with vehicle system 280 by way of communication channel 292. One or more messages 282 may be transmitted or received over communication channel 292. The communication channels included in this disclosure may be either wired or wireless, in different embodiments. Auxiliary device 250 may be considered a multi-channel digital video recorder (DVR) that stores one or more video channels. For example, auxiliary device 250 may store first images received from camera 231 and second images from camera 232. Auxiliary device 250 may further store images from camera X 260.

The auxiliary device 250 includes a CAN Interface 251, processing logic 255, a battery 254, and memory 256. Processing logic 255 may include communication interfaces to facilitate wired communication over various wired communication protocols (e.g. ethernet, USB, UART, etc.). Processing logic 255 may include communication interfaces to facilitate wireless communication over various wireless communication protocols (e.g. BlueTooth, cellular, IEEE 802.11x wireless communication signals and/or optical signals). Memory 256 may be provisioned or partitioned into memory segments dedicated to particular cameras. For example, memory space 257 may store images from camera 231 and memory space 258 may store images from camera 232. Memory 256 may include memory space for integer n number of cameras where memory space 259 represents the memory space for the nth camera in the array of n cameras. Memory 236 may include gigabytes or terabytes of storage, for example. Processing logic 235 and processing logic 255 may facilitate transmitting the images from the cameras to memory 256 by way of communication channel 295.

In some implementations, auxiliary device 250 does not include battery 254 nor memory 256 and does not function as a multi-channel DVR. Auxiliary device 250 may function as a messaging interface between camera 230 and vehicle communication bus 281. For example, auxiliary device 250 may include CAN interface 251 communicatively coupled to bus 281 and camera 230 may not necessarily include a CAN interface. Rather, camera 230 may rely on CAN interface 251 of auxiliary device 250 and communication channel 295 to receive the content of messages on bus 281.

The battery 254 in auxiliary device 250 may serve as a backup battery to further charge camera 230 (and optionally battery 234) when the vehicle is not turned on. Power interface 296 may provide the electrical power to camera 230. Auxiliary device 250 includes a CAN interface 251 in the illustrated implementation. In other implementations, interface 251 may be configured to a particular vehicle communication bus 281 when vehicle communication bus 281 is not a CAN bus. CAN interface 251 allows auxiliary device 250 to receive and/or transmit CAN messages onto vehicle communication bus 281 (when implemented as CAN bus). FIG. 2 illustrates that in some implementations, camera 230 includes a CAN Interface 244 that allows camera 230 to receive and/or transmit CAN messages onto vehicle communication bus 281 (when implemented as CAN bus) by way of communication channel 289. In some implementations, CAN Interface 244 may be included in processing logic 235. For example, when processing logic 235 is implemented as one or more processors or microcontrollers, a processor or microcontroller may include an on-board CAN transceiver to transmit and receive CAN messages.

System 200 further includes remote start module 270 and key locker 275. Camera 230 may be communicatively coupled to remote start module 270 via communication channel 293. Camera 230 may be communicatively coupled to key locker 275 via communication channel 294. Remote starter 270 may have a CAN interface 274. CAN interface 274 may be included in processing logic of remote starter 270. Remote starter 270 may be communicatively coupled to vehicle system 280 via communication channel 273. In some implementations, camera 230 is configured to read and/or write to bus 281 via CAN interface 274 of remote starter 270. In some implementations, remote starter 270 includes security features for a vehicle alarm.

Figure 3:
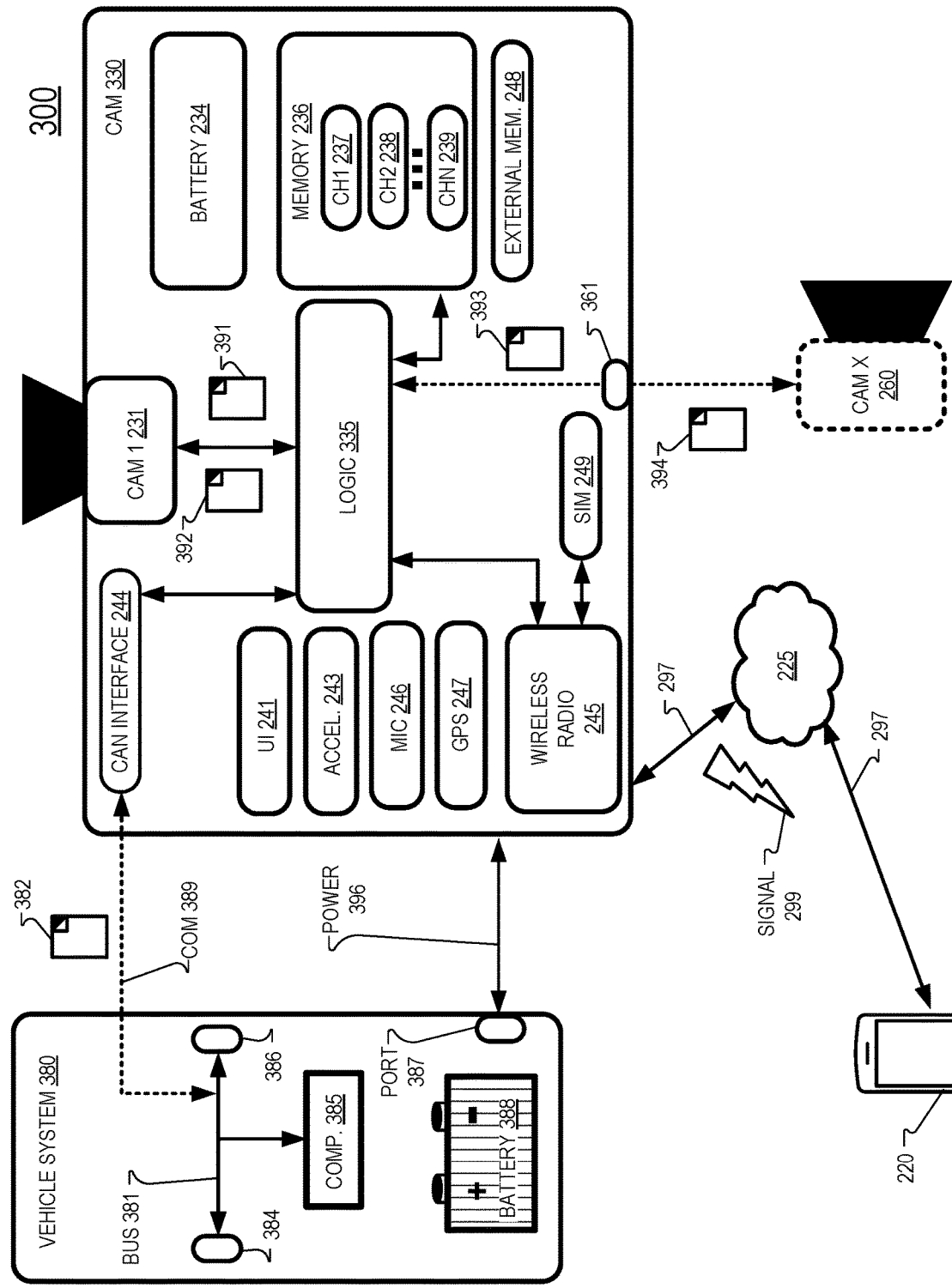
FIG. 3 illustrates a camera system for a vehicle having a camera and an auxiliary camera, in accordance with an embodiment of the disclosure.

FIG. 3 illustrates a camera system 300 for a vehicle having a camera 330 and an auxiliary camera X 260, in accordance with implementations of the disclosure. Camera 330 may be configured as a dash-cam. Camera 330 includes first camera 231 while camera 230 of FIG. 2 includes both a first camera 231 and a second camera 232. Camera 231 may be oriented to capture images out of a windshield (the front of vehicle 100). Camera 330 includes an auxiliary camera interface 361 configured to connect to auxiliary camera X 260 for capturing auxiliary event images 394. Auxiliary camera X 260 may be oriented to capture images of the cabin (interior) of the vehicle 100. Auxiliary camera X 260 may be oriented to capture images of the exterior of the vehicle, in some implementations. Auxiliary camera interface 361 may be implemented as a connector or jack that camera X 260 may plugin to.

In an implementation, processing logic 335 is configured to send a capture-command 393 to auxiliary camera interface 361 in response to receiving a trigger message 382 on a vehicle communication bus 381 of vehicle system 380. Trigger message 382 may be a CAN message when vehicle communication bus is a CAN bus. If auxiliary camera X 260 is connected to auxiliary camera interface 361, camera X 260 may capture auxiliary event image(s) 394 in response to receive the capture-command 393 from interface 361 and transmit the one or more auxiliary event images 394 to processing logic 335 via interface 361.

Processing logic 335 is communicatively coupled with CAN interface 244, wireless radio 245, memory 236, and camera 231, in the illustrated implementation of FIG. 3. While not specifically illustrated, processing logic 335 may be communicatively coupled to accelerometer 243, microphone 246, GPS sensor 247, and UI 241. In an implementation, bus 381 is a CAN bus coupled to factory vehicle computer 385 where the CAN bus is configured to receive messages from the factory vehicle computer. Camera 330 may be configured to receive messages from the CAN bus by way of communication interface 389. In FIG. 3, camera 330 includes CAN interface 244 configured to receive CAN message(s) 382 from the CAN bus, for example. In some implementations, CAN Interface 244 may be included in processing logic 335. For example, when processing logic 335 is implemented as one or more processors or microcontrollers, a processor or microcontroller may include an on-board CAN transceiver to transmit and receive CAN messages. In some implementations, camera 330 is configured to capture event images 392 in response to receiving a trigger message from vehicle communication bus 381. While not every message on bus 381 is a trigger message, a trigger message may be a message that triggers camera 330 to capture event images on camera 1 231 or camera X 260, for example. In an implementation, processing logic 335 is configured to send a capture-command 391 to camera 231 and camera 231 captures event images 392 in response to receiving capture-command 391.

In an implementation, camera 330 is configured to wirelessly transmit event notification images in response to receiving the trigger message from the CAN bus where the event notification images are derived from the event images captured by the camera. The event notification images may be wirelessly transmitted to a user device 220 by way of communication channel 297. In an implementation, the event notification images are all of the event images. In an implementation, the event notification images are a subset of the event images. In an implementation, the event notification images include reduced resolution images of the event images. In an implementation, the event images are in a video format and the event notification images include still images of the video format. In an implementation, the event images are in a video format and the event notification images are a truncated portion of the video format of the event images.

In some implementations, cameras 231 and/or 260 may capture event images in response to signals provided from accelerometer 243, microphone 246, and/or GPS sensor 247 to processing logic 335. Based on the signals from accelerometer 243, microphone 246, and/or GPS sensor 247, processing logic 335 may drive cameras 231 and/or 260 to capture event images. In some implementations, processing logic 335 drives cameras 231 and/or 260 to capture event images in response to a combination of (1) receiving a vehicle communication bus message (e.g. a CAN message) from bus 381; and (2) receiving signals provided by accelerometer 243, microphone 246, and/or GPS sensor 247.

In implementations, the trigger message may be (1) an unlock command indicating door locks of the vehicle are to be unlocked; (2) a lock command indicating door locks of the vehicle are to be locked; (3) a reverse message indicating the vehicle will traverse in reverse; (4) a fuel-level message indicating a level of fuel in the vehicle; (5) an odometer message indicating a mileage traveled by the vehicle; (6) a tire-pressure message (e.g. Tire Pressure Monitoring System (TPMS)) indicating a pressure of one or more tires of the vehicle; (7) an ignition-start command; (8) a speed-of-the-vehicle message; (9) an acceleration-of-the-vehicle message; (10) an unauthorized-access message indicating the vehicle is being tampered with; (11) an accelerometer measurement indicating the vehicle has been impacted; (12) a child car-seat indicator; (13) a seat belt sensor state; (14) a gear selector position; (15) a lane assist and collision avoidance state; (16) rain sensor data; (17) temperature sensor data; (18) ignition status; (19) vehicle tilt sensor data; (20) Anti-lock Brake System (ABS) data; (21) traction control data; (22) vehicle speed sensor data; (23) battery voltage level; (24) Vehicle Identification Number (VIN); (25) odometer reading; (26) Diagnostic Trouble Code (DTC) status; (27) a low tire pressure message (e.g. Tire Pressure Monitoring System (TPMS)); (28) Original Equipment Manufacturer (OEM) alarm status (e.g. armed, disarmed, alarm triggered, etc.); (29) tachometer reading; (30) vehicle door, vehicle hood, vehicle frunk, and/or vehicle trunk status (e.g. open or closed); (31) brake status; (32) E-brake status; (33) OEM Radio Frequency Identification (RFID) entry sensor(s) status (e.g. is a key fob detected in proximity with the vehicle); (34) vehicle key position; (35) oil warning status; (36) glowplug status; (37) battery pack level; (38) electric range; (39) vehicle range; (40) charge remaining; (41) charging status; (42) charge door status; and/or (43) clear engine DTC.

System 300 includes vehicle system 380. Vehicle system 380 includes a computer 385, a battery 388, a vehicle communication bus 381, and electronic modules 384 and 386. Vehicle communication bus 381 is communicatively coupled between vehicle computer 385 and electronic modules 384 and 386. Vehicle computer 385 may be a factory vehicle computer installed by the manufacturer that controls providing access to the vehicle and/or starting and stopping the vehicle. In one embodiment, vehicle system 380 includes a starting circuit that controls whether the vehicle can be started, by turning the keys in the ignition or by pushing a START/STOP button of the vehicle in combination with vehicle system 380 sensing a vehicle key. Vehicle system 380 may generally include electrical/electronic modules for operating a powerplant (electric, gasoline, diesel, fuel cell, hydrogen, etc.) of the vehicle, heating and cooling the vehicle, and providing vehicle information such as speed, position, and maintenance information to the user. Vehicle system 380 may include a plurality of electrical harnesses, electrical control modules, switches, and buttons. Vehicle communication bus 381 may be implemented as a CAN bus. Vehicle communication bus 381 is most often an original-equipment-manufacturer (OEM) installed bus.

Battery 388 of vehicle system 380 may be 12 VDC, 24 VDC, 48 VDC, or a larger voltage, for example. Port 387 may provide battery power from battery 388 to camera 330.

In an implementation, processing logic 335 is configured to drive an image sensor of a camera (e.g. camera 1 231 or camera X 260) to capture event images based on receiving a first CAN message and a second CAN message within a particular time period. By way, of example, if processing logic 335 receive a first CAN message that indicates the vehicle is going 55 mph (or another threshold speed) and a second CAN message indicating one or more doors of the vehicle is opened, (the first CAN message and the second CAN message received within 1 second of each other) processing logic 335 may initiate image captures with one or more of the cameras in system 300. Processing logic 235 of FIG. 2 may be configured similarly in order to drive any or all of cameras 231, 232, and 260 to capture event images in response to a first and second CAN message received in a particular time period.

Figure 4:
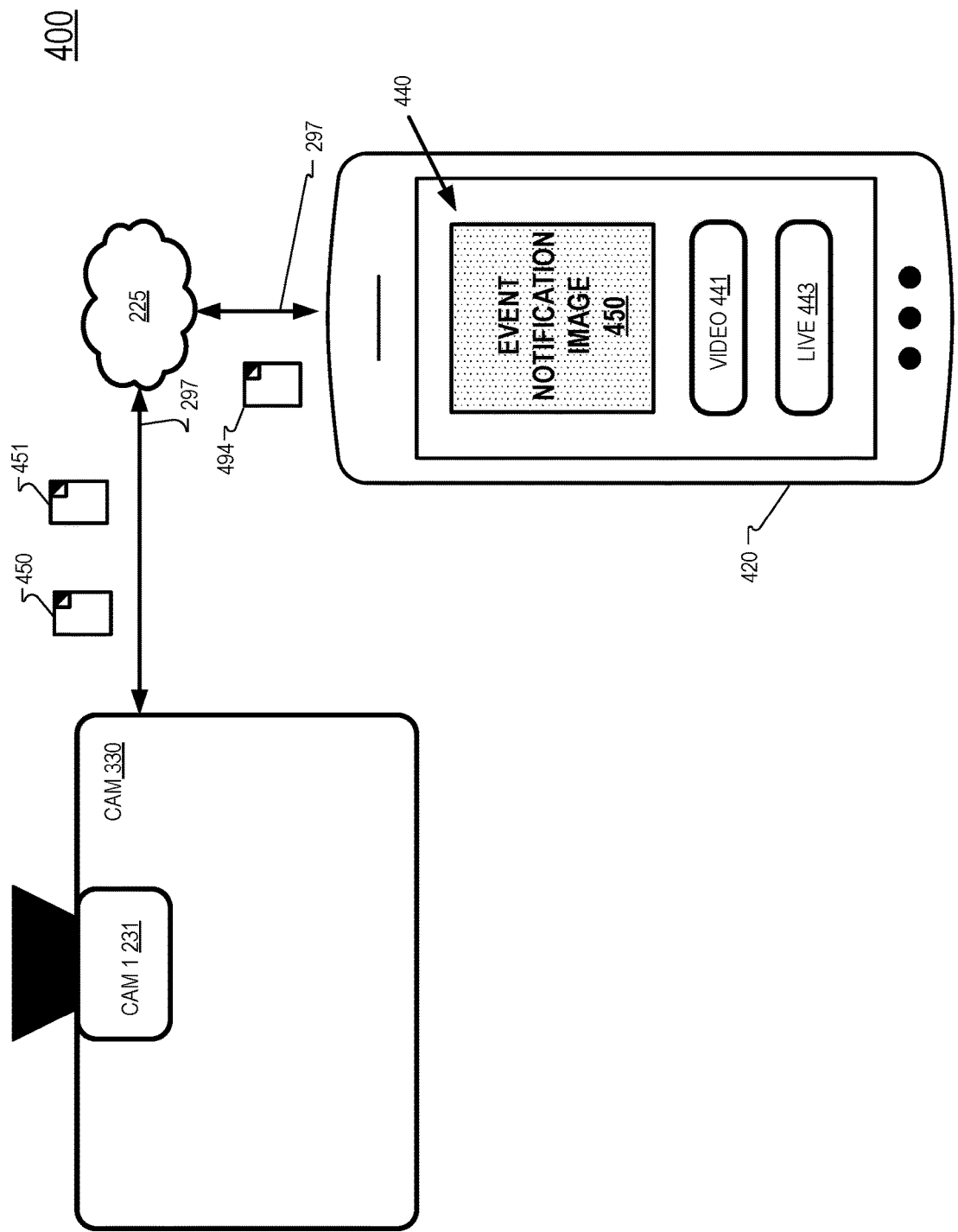
FIG. 4 illustrates an example system including a camera and a user device displaying an example user interface, in accordance with an embodiment of the disclosure.

FIG. 4 illustrates an example system 400 including a camera 330 and a user device 420 displaying an example user interface 440, in accordance with implementations of the disclosure. Example user interface 440 shows that an event notification image 450 may be displayed on user interface for viewing by a user of user device 420. Event notification image 450 may be a still image taken from a video captured by a camera in system 200 or 300. Event notification image 450 may be a truncated version of a video captured by a camera in system 200 or 300. Event notification image 450 may be a lower quality image or images than the CMOS image sensors of the cameras of systems 200 or 300 in order to save time or data in transmitting the event notification image over a cellular network (e.g. network 225) to user device 420.

Based on viewing event notification image(s) 450, a user may select software-VIDEO button 441 or software-LIVE button 443. If the user selects software-video button 441 in user interface 440, a response request 494 may be sent back to camera 330 via communication channels 297 and camera 330 may then wirelessly transmit additional event notification images 451 to user device 420 in response to receiving the response request 494. The additional event notification image 451 may be addition video footage of the event images that were captured by one of the cameras of systems 200 or 300. If the user selects software-LIVE button 443 in user interface 440, a response request 494 may be sent back to camera 330 via communication channels 297 and camera 330 may then wirelessly transmit additional event notification images 451 to user device 420 in response to receiving the response request 494. The additional event notification image 451 may be live or pseudo-live video footage of subsequent images that are being captured, in real-time by cameras of systems 200 or 300.

Figure 5:
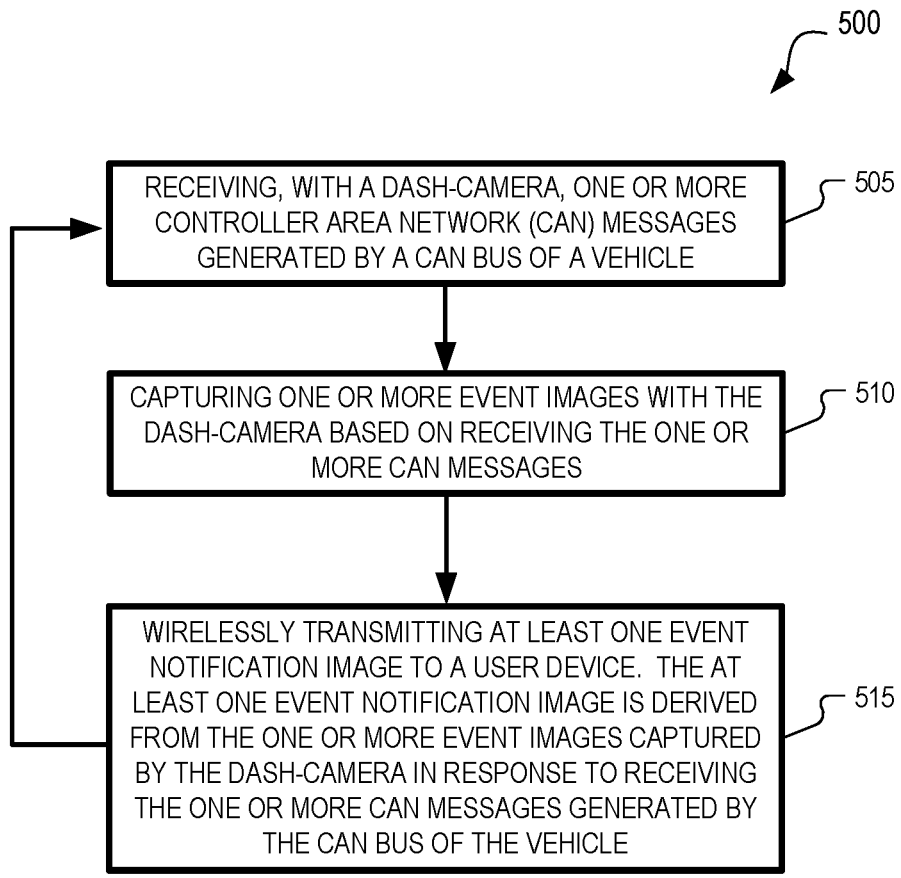
FIG. 5 illustrates an example process of a dash-camera capturing event images based on CAN messages, in accordance with an embodiment of the disclosure.

FIG. 5 illustrates an example process 500 of a dash-camera capturing event images based on CAN messages, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Processing logic 235 or 335 may perform all or a portion of the process blocks in FIG. 5.

In process block 505, a dash-camera receives one or more CAN messages generated by a CAN bus of a vehicle.

In process block 510, one or more event images is captured by the dash-camera based on receiving the one or more CAN messages. The event images may be in video format.

In process block 515, at least one event notification image is wirelessly transmitted to a user device (e.g. user device 220 or 420). The at least one event notification image is derived from the one or more event images captured by the dash-camera in response to receiving the one or more CAN messages. Wirelessly transmitting the event notifications images includes transmitting the event notifications images over a cellular network, in some implementations. In some implementations, wirelessly transmitting the event notification images includes transmitting the event notifications images over a wireless local area network (WLAN). Process 500 may return to process block 505 after executing process block 515, in some implementations.

In an implementation, process 500 further includes (1) receiving a response request (e.g. response request 494) from the user device; and (2) wirelessly transmitting additional event notification images to the user device in response to receiving the response request from the user device. In an implementation, the additional event notification images include a video of the event images and the event notification images included still images (as opposed to video images) of the event images.

In an implementation of process 500, the event notification images are all of the event images. In an implementation, the event notification images are a subset of the event images. In an implementation, the event notification images include reduced resolution images of the event images. In an implementation, the event images are in a video format and the event notification images include still images of the video format. In an implementation, the event notification images are all of the event images.

Figure 6:
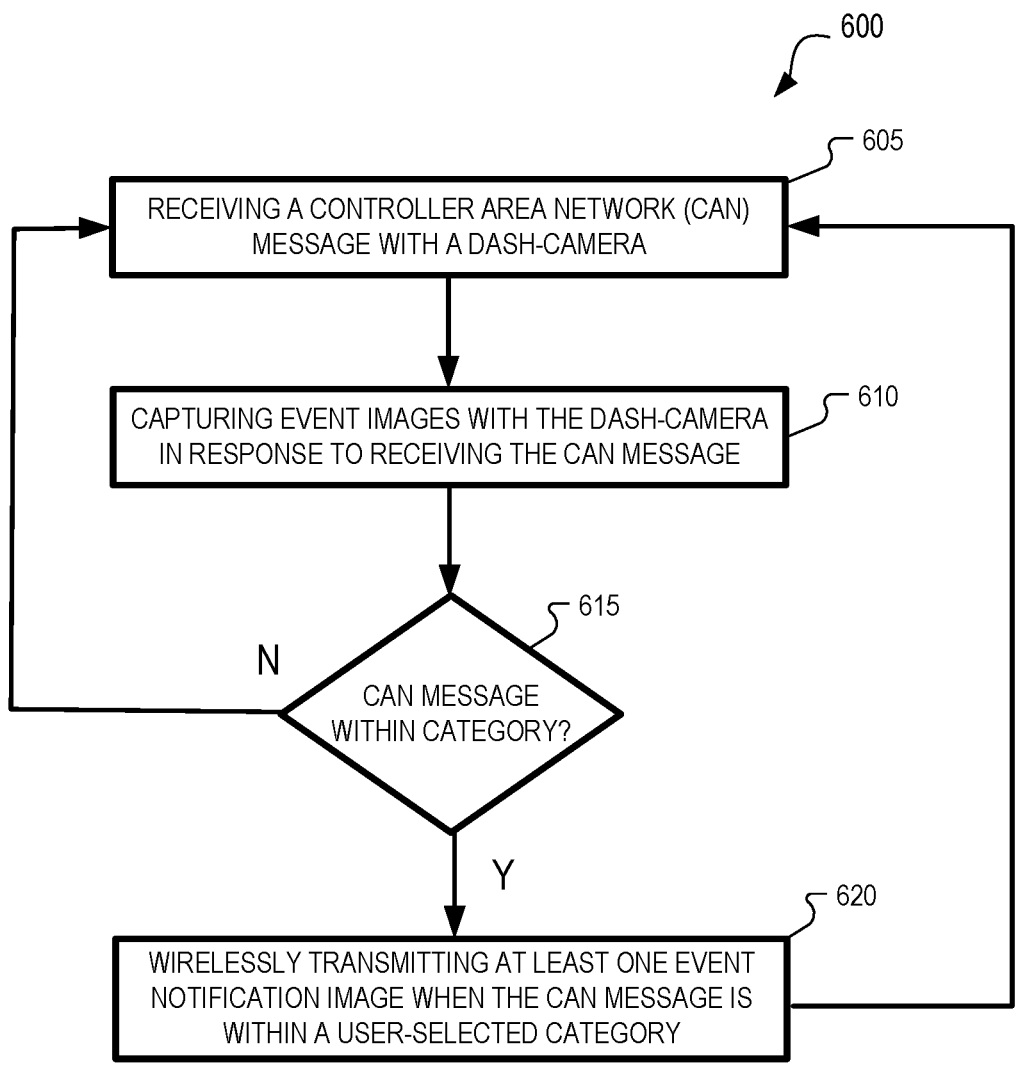
FIG. 6 illustrates an example process of event notification based on message category, in accordance with an embodiment of the disclosure.

FIG. 6 illustrates an example process 600 of event notification based on message category, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel. Processing logic 235 or 335 may perform all or a portion of the process blocks in FIG. 6.

In process block 605, a dash-camera receives a CAN message. In some implementations, a trigger signal is received by the dash-camera that may or may not be a CAN message.

In process block 610, event images are captured by the dash-camera in response to receiving the CAN message (or the trigger signal).

In decision block 615, process 600 returns to process block 605 if the CAN message (or trigger signal) is outside a user-selected category (and therefore no event notification images are wirelessly transmitted). If the CAN message (or trigger signal) is within a user-selected category, process 600 proceeds to process block 620.

In process block 620, at least one event notification image is wirelessly transmitted to a user device since the CAN message (or trigger signal) was within the user-selected category.

In order to provide the user control over notifications, certain CAN messages may be selected for transmission of event images. For example, a user may want event notification images sent to the user device when a CAN message indicates a certain vehicle speed, but not when the tire-pressure dips below a certain threshold.

In some implementations, the quality (e.g. resolution) or duration (e.g. video length) of the event images may be based on a category of the CAN message received.

An implementation of process 600 further includes (1) detecting a vehicle fob that is learned to the vehicle; and selectively omitting the wireless transmitting event notification images of process block 620 when the vehicle fob is detected within a given time period (e.g. 30 seconds) of receiving the CAN message (or trigger signal). The detection of the vehicle fob may be detected using hardware of system 200 or 300 or by way of CAN message analysis. Omitting transmitting event notification images to the user device while a learned/authorized fob is detected in proximity of the vehicle may reduce the number of notifications a user receives when the user themselves or another trusted user of the vehicle is operating the vehicle.

Figure 7:
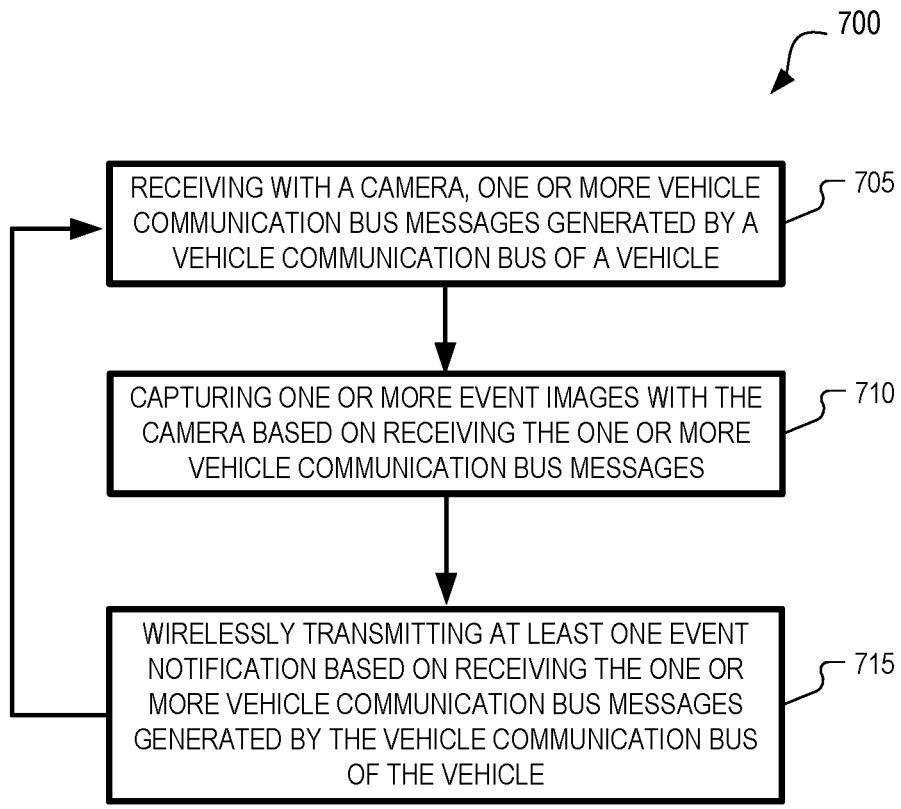
FIG. 7 illustrates an example process of event image capture by a camera based on a vehicle bus message, in accordance with an embodiment of the disclosure.

FIG. 7 illustrates an example process 700 of event image capture by a camera based on a vehicle bus message, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. Processing logic 235 or 335 may perform all or a portion of the process blocks in FIG. 7.

In process block 705, a camera received a vehicle communication bus message generated by a vehicle communication bus (e.g. vehicle communication bus 281 or 381) of a vehicle.

In process block 710, one or more event images are captured with the camera based on receiving the one or more vehicle communication bus messages.

In process block 715, an event notification is wirelessly transmitted based on receiving the one or more vehicle communication bus messages. The event notification may include an image or just text.

In an implementation, wirelessly transmitting the event notification includes transmitting the event notification over a cellular network. In an implementation, wirelessly transmitting the event notification includes transmitting the event notification to a user device. In an implementation, the event notification includes at least a portion of the event images captured by the camera based on receiving the one or more vehicle communication bus messages.

First Example Implementation

In an implementation, a vehicle includes a factory vehicle computer (e.g. computer included in system 280), a vehicle communication bus (e.g. bus 281), and a camera residing in a cabin of the vehicle (e.g. one of camera 231, 232 and/or 260). The factory vehicle computer controls operation of vehicle (e.g. vehicle 100) and controls access to the vehicle. The vehicle communication bus is coupled to the vehicle computer. The vehicle communication bus is configured to receive messages from the vehicle computer. The camera is configured to receive the messages from the vehicle communication bus and the camera is configured to capture event images in response to receiving a trigger message from the vehicle communication bus. The trigger message may be received by cameras 231, 232, or 260 via wireless or wired communication via auxiliary device 250. Cameras 231, 232, or 260 may receive the trigger message directly from the vehicle system 280, in some implementations. Message 287 may be a trigger message received by camera 230 from auxiliary device 250, in some implementations. The trigger message may be a CAN message or be a derivation of a CAN message generated by auxiliary device 250. For example, auxiliary device 250 may generate an analog or digital trigger message 287 derived from (or translated from) a message (e.g. message 282) from bus 281.

The vehicle communication bus may be a CAN bus. The trigger message may include a reverse message indicating the vehicle will traverse in reverse. The trigger message may include at least one of (1) an unlock command indicating door locks of the vehicle are to be unlocked; or (2) a lock command indicating door locks of the vehicle are to be locked. For example, if someone engages a door handle of the vehicle with an access fob in close proximity, vehicle system 280 may generate an unlock message on bus 281. In other examples, a person may transmit an unlock or lock command to the car via a remote control and vehicle system 280 may generate a lock or unlock message on bus 281.

The trigger message may include at least one of (1) an ignition-start command; (2) a speed-of-the-vehicle message; or (3) an acceleration-of-the-vehicle message. Hence, the camera may take pictures and/or video in response to receiving a message from a CAN bus of the vehicle. This may be particularly useful to capture event images or videos when the vehicle is started (e.g. user engages a starting interface such as key ignition or START/STOP button), the vehicle is going over a threshold speed limit for a particular amount of time, or the vehicle is being driven with high acceleration values (perhaps indicative of aggressive driving). In the case of a vehicle with a petrol-based engine, the START/STOP button may engage a starter to turn over and start the engine of the vehicle. In the case of an electric vehicle, the starting interface may allow for operation of the battery power plant to power the drivetrain of the vehicle to operate/navigate the vehicle.

The trigger message may include an unauthorized-access message indicating the vehicle is being tampered with. The trigger message may include an accelerometer measurement indicating the vehicle has been impacted in an accident. The trigger message may include an indication that one or more airbags has been deployed. Capturing still images and/or video would be useful at a time of an accident or just before.

The camera may be configured to permanently store event images in a memory in response to receiving the trigger message from the vehicle communication bus. The camera may be further configured to permanently store prior-captured event images to the memory where the prior-captured event images were stored in the memory for a time period prior to the camera receiving the trigger message. In other words, the systems of this disclosure may be configured to continuously record still images and or video to a memory over a certain time period (e.g. 1 hour or 24 hours). The new video would then record over the prior video on a rolling basis such that the memory always records the last 24 hours of video. However, the camera may be configured to save prior-captured event images that were recorded prior to receiving the trigger message. For example, the camera may receive a trigger message and save an "event video" that includes 5 minutes before the trigger message was received and 5 minutes after the trigger message was received. In the context of an accident, the still image and/or video may provide context for the situation before and after the accident. Similarly, in the context of a break-in to the vehicle, the still image and/or video may provide context for the situation before and after the break-in. The time period may be 5 seconds, 30 seconds, greater than 30 seconds, 1 minute, greater than 1 minute, 5 minutes, or otherwise.

In some implementations, the memory is remote from a camera body that holds the camera. This keeps the video out of the hands of a person with unauthorized access to the vehicle because the memory may be hidden in a difficult-to-access portion of the vehicle. Memory 256 may be remote from the camera, for example.

In some implementations, the vehicle is further configured to wirelessly transmit (e.g. WiFi or cellular) event notification images in response to receiving the trigger message from the vehicle communication bus where the event images are derived from the event images captured by the camera. The event notification images may be of significantly reduced file size to the images captured by the camera. This may increase the transmission of the images to a user device for example. It may also reduce the transmission payload that is transmitted over a cellular network for data usage considerations. In an implementation, still images of a video are transmitted to a user device (e.g. 220) as the event notification images where the original images were a high-definition (e.g. 720p or higher resolution) video.

In some implementations the vehicle further includes a second camera residing in the cabin of the vehicle (e.g. camera 232 or 260) and the camera is configured to capture second event images in response to the trigger message received from the vehicle communication bus. In other words, the trigger message received from bus 281 may cause more than one camera to capture event images. For example, camera 231 and camera 232 may both start capturing event images in response to the trigger message.

The second camera (camera 232 in some implementations) may be configured to image an interior of the cabin of the vehicle and the camera (camera 231 in some implementations) is configured to image the exterior of the vehicle through a window or windshield of the vehicle.

In some implementations, a third camera is configured to capture third event images in response to the trigger message received from the vehicle communication bus.

Any of the event images captured by the cameras may be sent to a user device in response to the trigger message. Although only three cameras are particularly illustrated in FIG. 2, it is understood that an array of n cameras can be included in systems of this disclosure and that all of the cameras in the array may start capturing event images in response to a trigger message from a vehicle communication bus.

Second Example Implementation

In an example implementation, a dash-camera for a vehicle includes an image sensor, a memory, and processing logic. The image sensor (e.g. an image sensor in camera 231, 232, or 260) is configured for capturing event images in or around the vehicle. The memory is coupled to the image sensor and configured to store, at least temporarily, the event images captured by the image sensor. The processing logic (e.g. logic 235) is communicatively coupled to the image sensor. The processing logic is configured to initiate an image-capture by the image sensor to capture the event images in response a trigger message on a vehicle communication bus (e.g. 281).

In an implementation, the processing logic is further configured to wirelessly transmit (e.g. WiFi or cellular transmission) event notification images in response to receiving the trigger message. The event notification images may be derived from the event images captured by the image sensor, similar to the description of event notification images above.

In an implementation, the processing logic is configured to receive the trigger message directly from the vehicle communication bus.

In an implementation, the processing logic is configured to receive a trigger command (e.g. 287) from a device (e.g. device 250) coupled to receive the trigger message (e.g. 282) from the vehicle communication bus. The trigger command may be generated in response to the device receiving the trigger message.

Third Example Implementation

In an implementation, a vehicle system includes a dash-camera (e.g. camera 230) and a remote device. The dash-camera includes a first image sensor (e.g. a first CMOS image sensor in camera 231) for capturing first event images in or around the vehicle and second image sensor (e.g. a second CMOS image sensor in camera 232 or 260) for capturing second event images in or around the vehicle. The remote device (e.g. device 250) receives a trigger message from a vehicle communication bus (e.g. 281) and transmit a trigger signal (e.g. 287) to the dash-camera. The dash-camera is configured to capture the first event images and the second event images in response to receiving the trigger signal.

In an implementation, the first image sensor is included in a wide field-of-view (FOV) first camera assembly (e.g. camera 231), and wherein the second image sensor is included in a wide field-of-view (FOV) second camera assembly (e.g. camera 232).

In an implementation, the vehicle system further includes a multi-channel digital video recorder (DVR) that includes at least a first channel and a second channel. The first channel receives and stores the first event images from the first image sensor and the second channel receives and stores the second event images from the second image sensor. In other words, the vehicle system includes a multi-channel DVR where each channel may be dedicated to a specific camera. More than two channels (e.g. 3 or more channels) may be included in the multi-channel DVR In an implementation, the multi-channel DVR is included in the dash-camera. In an implementation, the multi-channel DVR is included in the remote device.

Fourth Example Implementation

In an example implementation, a computer-implemented method includes: (1) receiving, with a dash-camera (e.g. camera 230), a trigger signal (e.g. 287); (2) capturing event images with the dash-camera in response to receiving the trigger signal; and (3) wirelessly transmitting event notification images to a user device where the event notification images are derived from the event images captured by the dash-camera in response to the receiving the trigger signal.

The event notification images may include all of the event images. The event notification images may be a subset of the event images. The event notification images may include reduced resolution images of the event images. The event images may be in video format and the event notification images include still images of the video format.

The method may further include: (1) receiving a response request from the user device; and (2) wirelessly transmitting additional event notification images to the user device in response to receiving the response request from the user device.

The additional event notification images may include a video of the event images and the event notification images may include still images of the event images. The user device may be a mobile device (e.g. smartphone, tablet) or any other computing device such as a laptop or desktop computer. Wirelessly transmitting the event notification images may include transmitting the event notification images over a cellular network. Network 225 may include a cellular network including cellular towers and routers.

Wirelessly transmitting the event notification images may include transmitting the event notification images over a wireless local area network. Network 225 may include wireless access points. Camera 230 may prioritize transmission of known wireless networks over cellular transmission.

In an implementation, a triggers signal (e.g. message 287) indicates a trigger command (e.g. 282) has been transmitted onto a vehicle communication bus.

Fifth Example Implementation

In an implementation, a dash-cam for a vehicle includes a wireless radio, and image sensor, and processing logic. The wireless radio (e.g. 245) is configured to receive a remote-start message from a user device (e.g. 220). The user device may be a mobile device or a dedicated hand-held remote control. The image sensor is configured to capture images in or around the vehicle. The image sensor may be included in camera 231 or camera 232, for example. The processing logic is communicatively coupled to the image sensor and the wireless radio. The processing logic is configured to receive the remote-start message from the wireless radio and transmit a remote-start command (e.g. 283) to a remote-start controller (e.g. remote start controller 270) for starting an engine of the vehicle. Remote start controller 270 may be coupled to vehicle system 280 to engage or disengage a starter of the vehicle. Remote start controller 270 may be mounted near a steering column of the vehicle and include a relay to connect/disconnect a starting circuit of the vehicle.

Sixth Example Implementation

In an implementation, a dash cam for a vehicle includes a wireless radio, an image sensor, and processing logic. The wireless radio is configured to receive a key-locker access message from a user device (e.g. user device 220). The user device may be a mobile device or a dedicated hand-held remote control. The image sensor is configured for capturing images in or around the vehicle. The processing logic is communicatively coupled to the wireless radio. The processing logic is configured to receive the key-locker access message from the wireless radio and transmit a key-locker access command (e.g. 284) to a key locker 275 having a key locker body sized to store a vehicle key of the vehicle. The key locker 275 may selectively allow access to the vehicle based on the key-locker access command from the dash cam. Example implementations of key locker 275 may include the implementations disclosed in U.S. application Ser. No. 16/533,426 and/or U.S. application Ser. No. 15/992,832.

Seventh Example Implementation

In an implementation, a dash cam for a vehicle includes a first camera, a second camera, and an enclosure for housing the first camera and the second camera. The first camera is for imaging outside the vehicle and configured to receive outside image light through a windshield of the vehicle. The second camera is for imaging a cabin of the vehicle. The enclosure includes a windshield surface angled to conform to a slope of the windshield of the vehicle.

In an implementation, the windshield surface of the enclosure includes a void to accept a windshield mount that is adhered to the windshield.

Eighth Example Implementation

In an implementation, a system for a vehicle includes a remote-start module (e.g. 270), a receiver, and a dash-cam. The remote-start module is configured to start an engine of the vehicle. The receiver (not illustrated in FIGs) is configured to receive a wireless signal from a fob when the fob is within a proximity distance to the receiver. The receiver is communicatively coupled to the remote-start module. The dash-cam is configured to capture images and communicatively coupled to the remote-start module. The dash-cam is configured to wirelessly transmit the images to a user device in response to events and disable transmission of the images to the user device for a time period in response to the receiver receiving the wireless signal from the fob. In an example context, fobs carried by a user of the vehicle alert the receiver that the user is in close proximity to the vehicle. The dash-cam may be generally configured to send event notification images to the user device when the car is accessed. However, when the fob carried by the user is sensed in close proximity to the vehicle, emailing or texting the user event notification images is not needed as the user (indicated by fob proximity) is likely accessing the vehicle.

Ninth Example Implementation

In an implementation, a dash-cam for a vehicle includes a first camera, a second camera, a wireless radio, and processing logic. The first camera (e.g. 231) is for imaging outside the vehicle and the first camera is configured to receive outside image light through a windshield of the vehicle. The second camera (e.g. 232) is for imaging a cabin of the vehicle. The processing logic is communicatively coupled to the wireless radio, the first camera, and the second camera. The processing logic is configured to: (1) receive an ignition signal from a vehicle communication bus of the vehicle; (2) initiate an image capture with the second camera to capture one or more cabin images in response to receiving the ignition signal from the vehicle communication bus of the vehicle where the one or more cabin images include an image of a driver-seat area of the vehicle; and (3) commanding the wireless radio to transmit the one or more cabin images to a remote device. In this implementation, an image of a driver can be collected for when the vehicle is started.

Tenth Example Implementation

In an implementation, a dash-cam for a vehicle includes a wireless radio, an image sensor, and processing logic. The wireless radio (e.g. 245) is configured to receive a remote-start message from a user device (e.g. 220). The user device may be a mobile device or a dedicated hand-held remote control. The image sensor is configured to capture images in or around the vehicle. The image sensor may be included in camera 231 or camera 232, for example. The processing logic is communicatively coupled to the image sensor and the wireless radio. The processing logic is configured to receive the remote-start message from the wireless radio and transmit a remote-start command to the vehicle (e.g. vehicle system 280) for starting an engine of the vehicle. In contrast to the Fifth Example Implementation of the disclosure, the remote-start command is to vehicle system 280 (e.g. directly to bus 281) via communication channel 289 or via communication channels 295 and then 292.

In the disclosed implementations, a user may use a mobile application running on mobile device 220 of FIG. 2 to transmit various commands and signals to camera 230. In one implementation, the signals are transmitted from a mobile device to wireless radio 245 via a short-range wireless protocol, IEEE 802.11x protocols, and/or cellular data.

In some implementations, a mobile device (e.g. device 220) may be communicatively coupled with camera 230 via a wired or wireless connection (e.g. BlueTooth or WiFi). The mobile device may trigger camera 230 to capture images with one or more cameras 231, 232, or 260. For example, a phone call by a driver (while driving) using the mobile device may trigger the dash camera to take an image or video of the driver. Furthermore, sensors on the mobile device may trigger the dash cam to take a picture. For example, the accelerometer may trigger the dash camera to capture images in response to accelerations indicative of hard driving, harsh braking, and/or accident detection. The GPS sensor of the mobile device or GPS sensor 247 may also trigger camera 230 to capture images when the vehicle is in certain locations.

A dash camera may be configured to support video play back from an OEM screen in the car if the vehicle is equipped with software that allows the vehicle head unit and/or display to be controlled by the mobile device and function as an auxiliary display to the mobile device. An application (app) that can be installed on the mobile device may indicate if events occurred while the user was away from the vehicle. Video saved by the dash camera can be played back on the OEM display (via the app).

The term "processing logic" in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A "memory" or "memories" (e.g. 702) described in this disclosure may include volatile or non-volatile memory architectures.

Communication channels described herein may include wired or wireless communications utilizing IEEE 802.11 protocols, BlueTooth, SPI (Serial Peripheral Interface), I$^2$C (Inter-Integrated Circuit), USB (Universal Serial Port), CAN (Controller Area Network), cellular data protocols (e.g. 3G, 4G, LTE, 5G), or otherwise.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A vehicle comprising:
    a factory vehicle computer that controls operation of the vehicle and controls access to the vehicle;
    a Controller Area Network (CAN) bus coupled to the factory vehicle computer, wherein the CAN bus is configured to receive messages from the factory vehicle computer;
    a remote starter configured to engage or disengage a starter of the vehicle, wherein the remote starter includes a CAN interface; and
    a camera residing in a cabin of the vehicle, wherein the camera is configured to: (1) read the CAN bus via the CAN interface of the remote starter; and (2) capture event images in response to receiving a trigger message from the CAN bus via the CAN interface of the remote starter.

2. The vehicle of claim 1, wherein the vehicle is further configured to wirelessly transmit event notification images in response to receiving the trigger message from the CAN bus, wherein the event notification images are derived from the event images captured by the camera.

3. The vehicle of claim 2, wherein the vehicle is configured to transmit the event notification images over a cellular network.

4. The vehicle of claim 2, wherein the event notification images are of significantly reduced file size to the event images.

5. The vehicle of claim 1, wherein the trigger message includes at least one of (1) an unlock command indicating door locks of the vehicle are to be unlocked; (2) a lock command indicating door locks of the vehicle are to be locked; (3) a reverse message indicating the vehicle will traverse in reverse; (4) a fuel-level message indicating a level of fuel in the vehicle; (5) an odometer message indicating a mileage traveled by the vehicle; (6) a tire-pressure message indicating a pressure of one or more tires of the vehicle; (7) an ignition-start command; (8) a speed-of-the-vehicle message; (9) an acceleration-of-the-vehicle message; (10) an unauthorized-access message indicating the vehicle is being tampered with; (11) an accelerometer measurement indicating the vehicle has been impacted; (12) a child car-seat indicator; (13) a seat belt sensor state; (14) a gear selector position; (15) a lane assist and collision avoidance state; (16) rain sensor data; (17) temperature sensor data; (18) ignition status; (19) vehicle tilt sensor data; (20) Anti-lock Brake System (ABS) data; (21) traction control data; (22) vehicle speed sensor data; (23) battery voltage level; (24) Vehicle Identification Number (VIN); (25) odometer reading; (26) Diagnostic Trouble Code (DTC) status; (27) a low tire pressure message (e.g. Tire Pressure Monitoring System (TPMS)); (28) Original Equipment Manufacturer (OEM) alarm status (e.g. armed, disarmed, alarm triggered, etc.); (29) tachometer reading; (30) vehicle door, vehicle hood, vehicle frunk, and/or vehicle trunk status (e.g. open or closed); (31) brake status; (32) E-brake status; (33) OEM Radio Frequency Identification (RFID) entry sensor(s) status (e.g. is a key fob detected in proximity with the vehicle); (34) vehicle key position; (35) oil warning status; (36) glowplug status; (37) battery pack level; (38) electric range; (39) vehicle range; (40) charge remaining; (41) charging status; (42) charge door status; or (43) clear engine DTC.

6. A dash-camera for a vehicle, the dash-camera comprising:
   an image sensor for capturing event images in or around the vehicle;
   a Controller Area Network (CAN) bus interface;
   a wireless radio configured to receive a remote-start message from a user device; and
   processing logic communicatively coupled to the image sensor, the CAN bus interface, and the wireless radio, wherein the processing logic is configured to:
   receive a remote-start message from the wireless radio; and
   transmit, with the CAN bus interface of the dash-camera, a remote-start command to the vehicle by way of a CAN bus of the vehicle.

7. The camera of claim 6, wherein the wireless radio includes a cellular interface.

8. The camera of claim 6, wherein the remote-start command is for starting an engine of the vehicle.

* * * * *